Dec. 8, 1931.  A. F. CONNERY  1,835,281
REGENERATIVE CABLE REPEATER FOR TELEGRAPH SYSTEMS
Filed Aug. 31, 1929
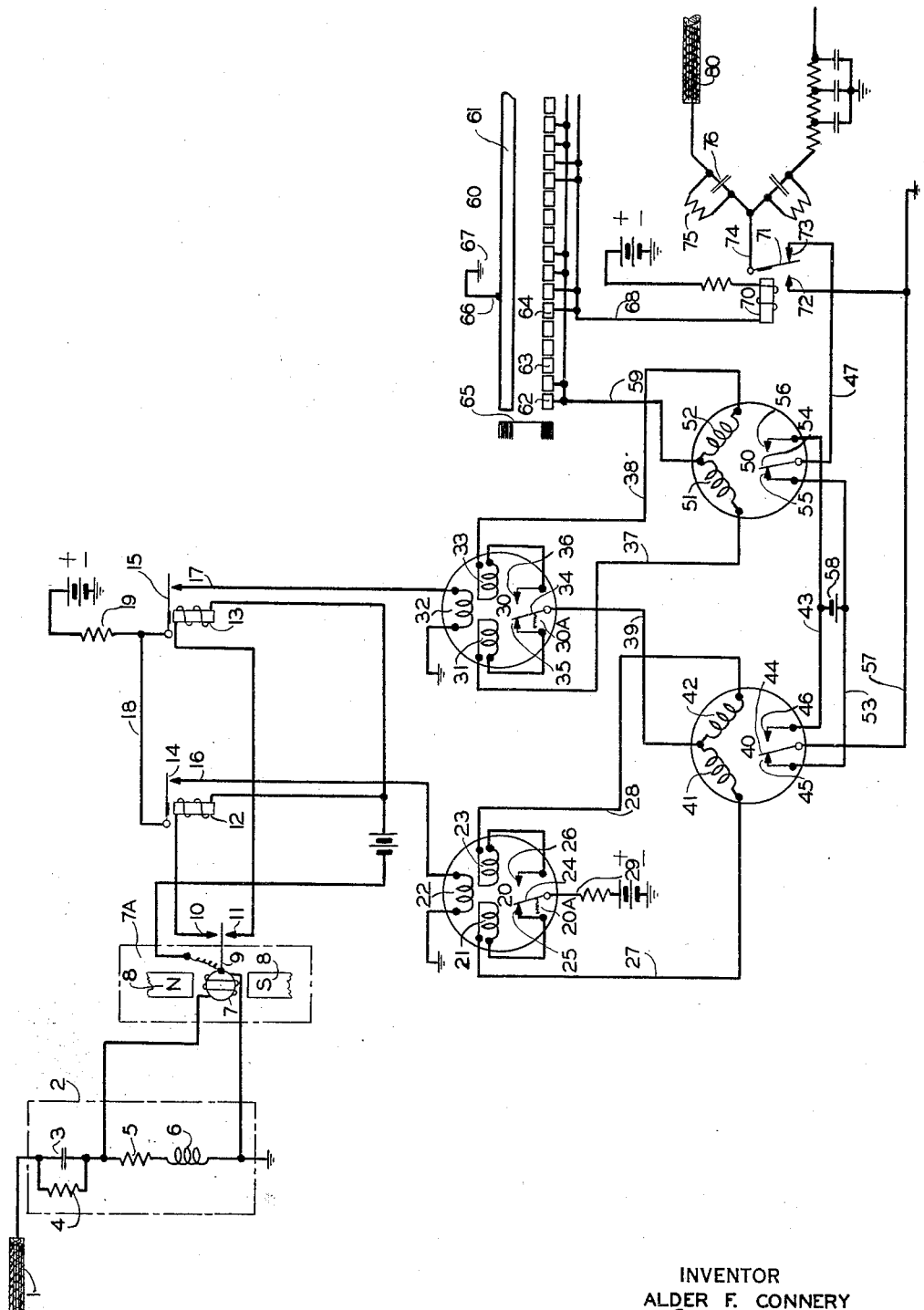
INVENTOR
ALDER F. CONNERY
BY *F. Hutchinson*
ATTORNEY Patented Dec. 8, 1931

1,835,281

UNITED STATES PATENT OFFICE

ALDER F. CONNERY, OF BROOKLYN, NEW YORK, ASSIGNOR TO POSTAL TELEGRAPH-CABLE COMPANY, OF NEW YORK, N. Y., A CORPORATION OF NEW YORK

REGENERATIVE CABLE REPEATER FOR TELEGRAPH SYSTEMS

Application filed August 31, 1929. Serial No. 389,739.

This invention relates to a regenerative cable repeater which takes the distorted signals received over a cable, regenerates them and re-transmits said signals thus regenerated into another cable, or into a local receiving apparatus.

The objects of this invention are economy, simplicity and increased efficiency. In the drawing comprising but a single sheet of one figure, the invention is schematically set forth.

Referring to the drawing the signals are received from cable 1 receiving condenser 3 which is shunted by resistance 4 through resistance 5 and magnetic shunt 6. Resistance 5 and magnetic shunt 6 are shunted by the winding 7 of cable relay 7A. The network 3, 4, 5 and 6 connected as shown is used to shape the signals received over the cable. A shaping network such as this is well known in the cable art and need not be further described here.

The signals received over the cable actuate the moving coil 7 and thereby cause the tongue 9 of the cable relay to make contact with either 10 or 11 or rest in a position midway between 10 and 11. If tongue 9 makes contact with 10 then relay 12 will be operated and similarly when tongue 9 makes contact with contact 11 relay 13 will be operated. Relays 12 and 13 respectively are known as the dot and dash receiving relays.

When tongue 14 of the dot receiving relay makes contact with 16 then polar relay 20 will be operated providing there is no locking current in windings 21 or 23. Similarly if tongue 15 should make contact with 17, relay 30 will be operated if no locking current exists in windings 31 or 33. It should be noted that relays 20 and 30 are so arranged that when no current exists in any of their windings their tongues 24 and 34 will make contact with 25 and 35 by virtue of the retractional springs with which relays 20 and 30 are provided at 20A and 30A.

Assume, for example, that relay 12 is energized and that relay 13 is not energized then armature 24 of relay 20 will make contact with 26 and armature 34 of relay 30 will make contact with 35. There will, however, be no current through the contacts or tongues of relays 20 and 30 and therefore transmitting relays 40 and 50 will not be operated.

The distributor 60 shown in schematic form consists of solid ring 61, live segments 62 and 64 and insulated segments 63. Brush 65 is so arranged as to travel from left to right and in so doing causes the various segments 62, 63 and 64 to make contact with solid ring 61. This segmented distributor is arranged to be driven at constant speed in synchronism with the received signals. The maintaining of the distributor brushes in synchronism with received signals is well known in the art and since it forms no part of this invention it will not be described here.

When the brush 65 is passing over segments 62 the following circuit will be completed: from positive battery through resistance 29, tongue 24, contact 26, winding 23, conductor 28, winding 42, tongue 34, contact 35, winding 31, winding 51, conductor 59, segments 62, brush 65, solid ring 61, through conductor 66 to ground 67. It will be noted that the path of the circuit just described goes through windings of relays 20, 30, 40 and 50. The current will hold the armature of relay 20 firmly on the contact on which it may be resting, which in this instance is contact 26.

The current through the winding of relay 40 will cause the armature of that relay to be firmly held on contact 46 or in other words, relay 40 is made to assume the same position as relay 20. Relay 50 is also made to assume the position of relay 30.

It should be noted that the current in the operating windings 22 and 32 of relays 20 and 30 is weaker than the current in the locking windings 21, 23, 31 and 33 of those relays and so long as there is current in the locking windings those relays will be held firmly to the position they may be in, regardless of any change in current value in the operating windings. In other words, when the brush is not resting on segments 62, relay 20 is controlled by relay 12 and relay 30 is controlled by relay 13. When the brush 65 makes contact with segment 62 then relay 20 is locked up and relay 40 is moved to take the same position as the relay 20, relay 30 is similarly locked up and relay 50 assumes the position of relay 30.

If, during the time brush 65 is on segment 62 the relays 12 or 13 should move, relays 20 and 30, since they are locked up will not move, and therefore there is no possibility of getting split or improper signals sent out from relays 40 and 50.

A circuit as just described will regenerate the signals received on relays 12 and 13 because relays 40 and 50 will send on the signal and only operate at the instant that brush 65 makes contact with segment 62 and cannot be operated at any other point.

Relays 40 and 50 are unbiased and arranged to lie against which ever contact they may be touching when there is no current in their windings. The tongues and contacts of relays 40 and 50 are so connected to battery 58 and conductor 47 as to make the conductor 47 either positive, negative or zero potential with respect to ground depending upon whether relay 40 or 50 or neither are operated. The connections to the tongue or contacts of relays 40 and 50 follow conventional cable practice. If, for example, a letter "h" was received over cable 1, then the armature of relay 40 would lie against contact 45 for 4 units of time, since the letter "h" consists of four units of positive current. In order to break this long contact into beats, which are preferred for cable operation, the relay 70 is connected to segments 64. This relay will operate for a moment each time the brush 65 passes over segments 64 and will momentarily connect the outgoing cable 80 to ground, since when the relay 70 is operated the tongue 71 will make contact with 72 which is connected to ground. When, however, relay 70 is unoperated tongue 71 will be lying against its back contact 73 and conductor 47 will be connected to 74, shunted condenser 76 into the cable 80. If it is desired to increase the grounding time this may be done by lengthening segments 64.

What is claimed is:

1. A regenerative repeater comprising receiving relay means biased to a fixed position except when actuated by received signals, retransmitting relay means which remains in any position to which it is operated, a distributer having segments connected in series with an output circuit of the receiving relay means and an input circuit of the transmitting relay means whereby the transmitting relay means is controlled by the receiving means at approximately the time the center of a signal impulse is received, and a curbing relay controlled through curbing segments on said distributer for connecting ground to said outgoing line between successive unit impulses.

2. A regenerative repeater for submarine cables comprising, in combination with an incoming and an outgoing line, a synchronous distributer, relay means under the joint control of received signal impulses and said distributer for regenerating and repeating received signal impulses, a connection between said relay means and the outgoing line, a relay adapted to be energized periodically through contacts on said distributer and having contacts adapted, when the relay is energized to disconnect the outgoing line from said repeating relay means and connect it to ground.

3. Means as set forth in claim 2 in which the distributer comprises only one segmented ring.

4. A regenerative repeater for submarine cables comprising, in combination with an incoming and an outgoing line, contact means operating in synchronism with received signal impulses, relay means under the joint control of received signal impulses and said contact means for regenerating and repeating received signal impulses, and a separate relay under the control of said contact means for periodically applying zero impulses to the outgoing line independently of said first relay means.

5. A regenerative repeater for cable code operation comprising, receiving relay means, transmitting relay means controlled thereby for retransmitting received signals, intermittent contact means operated synchronously with received signals, a relay having contacts in the output circuit of said transmitting relay and a winding in circuit with said intermittent contact means whereby a zero impulse is periodically transmitted.

6. A regenerative repeater for cable code operation comprising, in combination with an incoming line and an outgoing line, receiving relay means, transmitting relay means, contact means operating synchronously with received signals and periodically closing a circuit between the receiving relay means and transmitting relay means whereby the latter is controlled by the former, and switching mechanism normally connecting said outgoing line with said transmitting relay means and adapted to periodically connect said outgoing line to ground under control of said contact means.

7. In a regenerative repeater, the combination with a distributor having segments for determining the length of the regenerated unit impulses of a curbing relay under the control of other segments of said distributor for connecting ground to the outgoing line between successive unit impulses.

8. The method of curbing signals transmitted from a regenerative telegraph repeater which comprises positioning the tongues of a first group of relays by incoming signals and thereafter positioning the tongues of a second group of relays through the conjoint action of a distributor having a single segmented ring and said first group of relays, one relay of said second group being arranged to transmit a curbing impulse at regular intervals.

9. A telegraph repeater comprising, a distributor and circuits therefor, a plurality of relays including a transmitting relay having two contacts, said transmitting relay having an energizing circuit controlled by said distributor and being arranged to send a curbing impulse from one of said contacts, and positive, negative or no current impulses from the other of said contacts according to the impulses received by other of said relays.

10. A telegraph repeater comprising, a distributor and circuits therefor, a plurality of relays including a transmitting relay having two contacts, means for transmitting a curbing impulse from one of said contacts, means for transmitting positive, negative and no current impulses from the other of said contacts according to the impulses received by other of said relays, a single segmented ring for said distributor, said ring being the sole means for controlling the duration of the transmitted impulses.

11. A telegraph repeater comprising, a distributor having a single segmented ring and an unbroken ring associated therewith, receiving relays and a transmitting relay and circuits therefor, said transmitting relay having but two operating positions, said distributor and said receiving relays being arranged to control said transmitting relay so that positive, negative and no current impulses of uniform length may be transmitted.

12. A telegraph repeater for regenerating impulses composed of positive, negative and no current intervals comprising, a plurality of receiving relays, transmitting relays controlled by the receiving relays, a distributor operating in synchronism with received signals, said distributor having a single segmented ring, said ring being the sole means for regulating the length of impulses sent out from said transmitting relays.

ALDER F. CONNERY.